United States Patent [19]

Forsell et al.

[11] Patent Number: 5,440,186
[45] Date of Patent: Aug. 8, 1995

[54] MOTOR WITH ISOLATED BRUSH CARD ASSEMBLY

[75] Inventors: Eric A. Forsell, Sterling Heights; Jeffrey L. Mackay, LaSalle, both of Mich.

[73] Assignee: United Technologies Automotive, Inc., Dearborn, Mich.

[21] Appl. No.: 121,025

[22] Filed: Sep. 13, 1993

[51] Int. Cl.6 ........................ H02K 5/14; H02K 13/00; H02K 15/12; H02K 5/10

[52] U.S. Cl. ........................ 310/239; 310/42; 310/45; 310/89

[58] Field of Search ........................ 310/42, 43, 45, 51, 310/71, 89, 239, 88

[56] References Cited

U.S. PATENT DOCUMENTS

| | | | |
|---|---|---|---|
| 2,207,251 | 7/1940 | Guedon | 310/51 |
| 3,482,125 | 12/1969 | Fleckenstein | 310/42 |
| 3,654,504 | 4/1972 | Susdorf et al. | 310/239 |
| 3,749,457 | 7/1976 | Latussek et al. | 384/223 |
| 4,293,789 | 10/1981 | King | 310/239 |
| 4,623,812 | 11/1986 | van de Griend | 310/268 |
| 4,694,214 | 9/1987 | Stewart, Sr. | 310/239 |
| 4,713,568 | 12/1987 | Adam et al. | 310/42 |
| 4,792,307 | 12/1988 | Stewart, Sr. | 439/26 |
| 4,910,861 | 3/1990 | Dohogne | 310/43 |
| 4,952,831 | 8/1990 | Isozumi et al. | 310/71 |
| 4,978,876 | 12/1990 | Koster | 310/239 |
| 5,006,747 | 4/1991 | Stewart, Sr. | 310/239 |
| 5,159,221 | 10/1992 | Miyazaki et al. | 310/239 |
| 5,237,231 | 8/1993 | Blaettner et al. | 310/239 |
| 5,280,210 | 1/1994 | Kress et al. | 310/71 |

*Primary Examiner*—Steven L. Stephan
*Assistant Examiner*—Clayton E. LaBalle
*Attorney, Agent, or Firm*—Harness, Dickey & Pierce

[57] ABSTRACT

A brush card assembly for an electric motor is partially encapsulated within an elastomeric material thereby reducing vibrations from transferring from the brush card assembly to an adjacent housing.

16 Claims, 3 Drawing Sheets

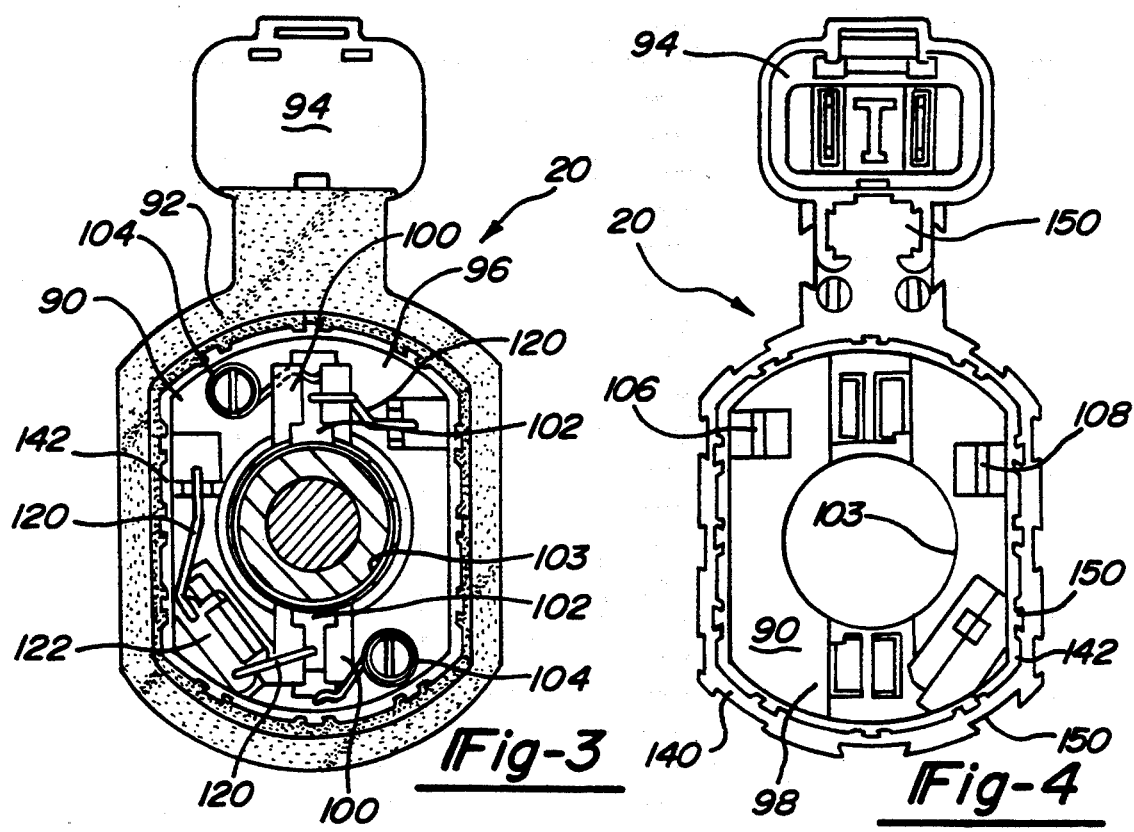
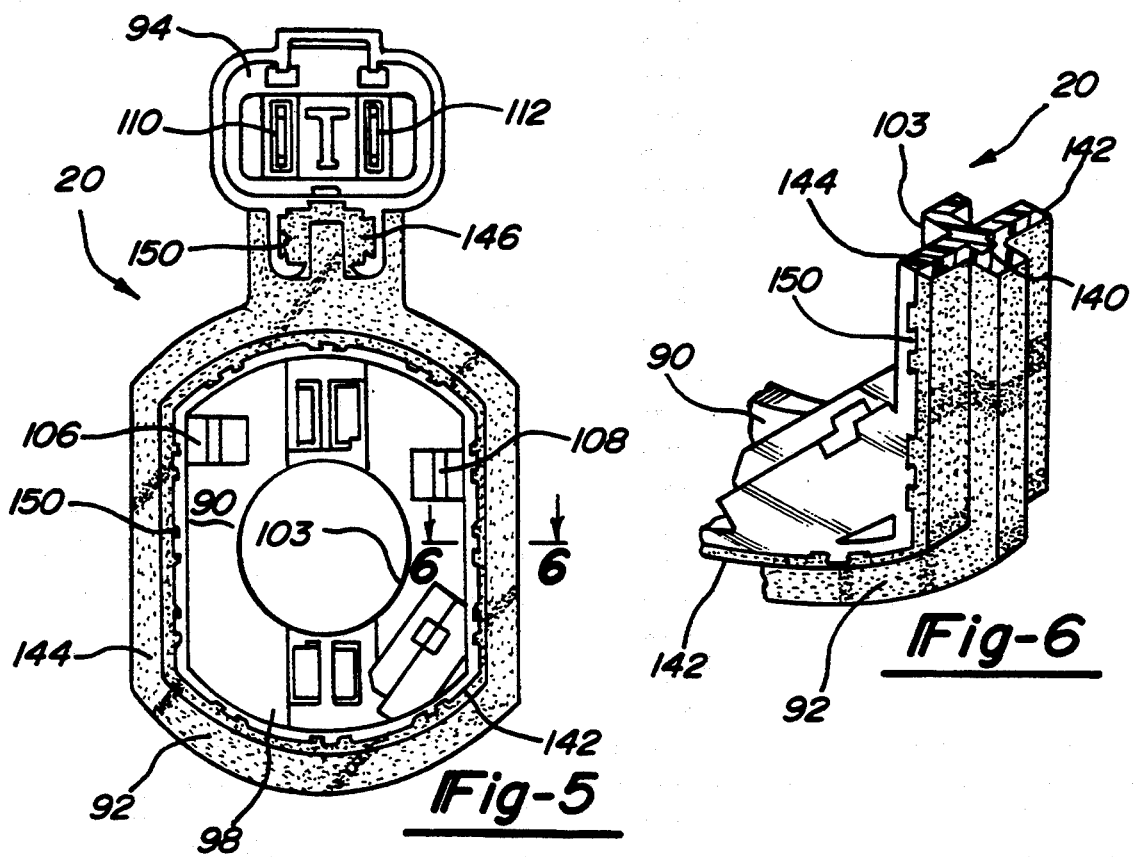

MOTOR WITH ISOLATED BRUSH CARD ASSEMBLY

BACKGROUND OF THE INVENTION

This invention relates generally to motors and specifically to an electromagnetic motor with an isolated brush card assembly.

It is common to use a variety of direct current (dc) electromagnetic motors within automotive vehicles. Typical operating applications include window lift motors, windshield wiper motors, anti-lock braking system motors, et cetera. The aforementioned motors often have brushes and commutators. Traditionally, the brush riggings for these motors vary in design but in general consist of boxes to house the brushes, a spring means to apply pressure to the brushes urging them against the commutator, and electrical leads to provide a current path to the brushes. A mounting surface secures these elements as well as provides a means to secure an entire brush card assembly to a housing in such a manner as to place the brushes in a proper working relationship with the commutator.

One of the most popular conventional designs, especially for small fractional horse power dc motors, is to utilize a single piece molded brush card member formed from a high temperature resistant plastic which is electrically nonconductive. The brush card member further has a pair of brush boxes formed thereon as well as an opening for receiving a portion of an armature shaft and the commutator secured to the shaft. This type of motor and brush card construction is disclosed in U.S. Pat. Nos.: 5,006,747 entitled "Dynamoelectric Machine Brush Rigging and Method of Assembly," which issued to Steward, Sr. on Apr. 9, 1991; and 4,694,214 entitled "Brush Holder for Dynamoelectric Machines," which also issued to Steward, Sr. but on Sep. 15, 1987, both of which are owned by the present assignee and are incorporated by reference herewithin.

While the aforementioned brush card constructions are significant improvements within the art, in recent years, the sound generated by the other motor components (such as bearings and gears) has been reduced to the point that the interface between the brushes and the commutator are now considered a significant contributor to the overall motor sound level. Since the armature and the commutator rotate up to 6,000 revolutions per minute, obtrusive noise is created by the brushes rubbing against the commutator surface and by the brushes catching on grooves longitudinally present along the exterior surface of the commutator. Accordingly, any vibration which is generated by interface of the brushes and commutator is transmitted along the brush card and through the adjacent armature housing and gear housing of the motor. This creates an undesirable audible sound.

Furthermore, water must be prevented from entering the joint between the armature and gear housings. This is traditionally accomplished by insertion of a separate seal or gasket between the brush card member and the armature housing. This necessitates extra parts, tolerance stackups and assembly labor costs.

Therefore, it is desirable to have a motor with a vibrationally isolated brush card assembly that also serves to seal between an armature housing and a gear housing.

SUMMARY OF THE INVENTION

In accordance with the present invention, the preferred embodiment of a new and useful motor has an isolated brush card assembly. The motor is comprised of a housing, a magnetic stator, an electromagnetic armature and a brush card assembly. The armature surrounds an armature shaft and a commutator is also mounted on the armature shaft longitudinally adjacent to the armature. Furthermore, the brush card assembly has an aperture with a pair of electrically conductive brushes positioned proximate thereto. The armature shaft is rotatably journalled within the aperture of the brush card assembly such that the pair of brushes electrically interface with an exterior surface of the commutator. Significantly, provision is made for encapsulating a portion of the brush card assembly which interfaces with the housing in an elastomeric material. Therefore, the brush card assembly has improved vibrational isolation from the adjacent housing. As a consequence, the elastomeric material reduces objectionable noise from being transmitted from the brush card assembly to the housing where it would otherwise be acoustically amplified. In another aspect of the present invention, the partially encapsulated brush card assembly provides a water seal between a pair of housings. Accordingly, extraneous seals or gaskets are eliminated thereby improving the quality and lowering the assembly costs required to construct the present invention motor.

Additional advantages and features of the present invention will become apparent from the following description and appended claims, taken in conjunction with the accompanying drawings.

BRIEF DESCRIPTION OF THE DRAWINGS

FIG. 3 is an end elevational view, taken along line 3—3 of FIG. 2, of a brush card assembly of the present invention motor;

FIG. 4 is an end elevational view, opposite from that of FIG. 3, showing the brush card assembly of the present invention motor of FIG. 1 with an elastomeric material removed;

FIG. 5 is an end elevational view, similar to that of FIG. 4, showing the brush card assembly of the present invention motor of FIG. 1 partially encapsulated within the elastomeric material; and FIG. 6 is a fragmentary perspective view, taken along line 6—6 of FIG. 5, showing the brush card assembly of the present invention motor.

DETAILED DESCRIPTION OF THE PREFERRED EMBODIMENT

Figure 1:
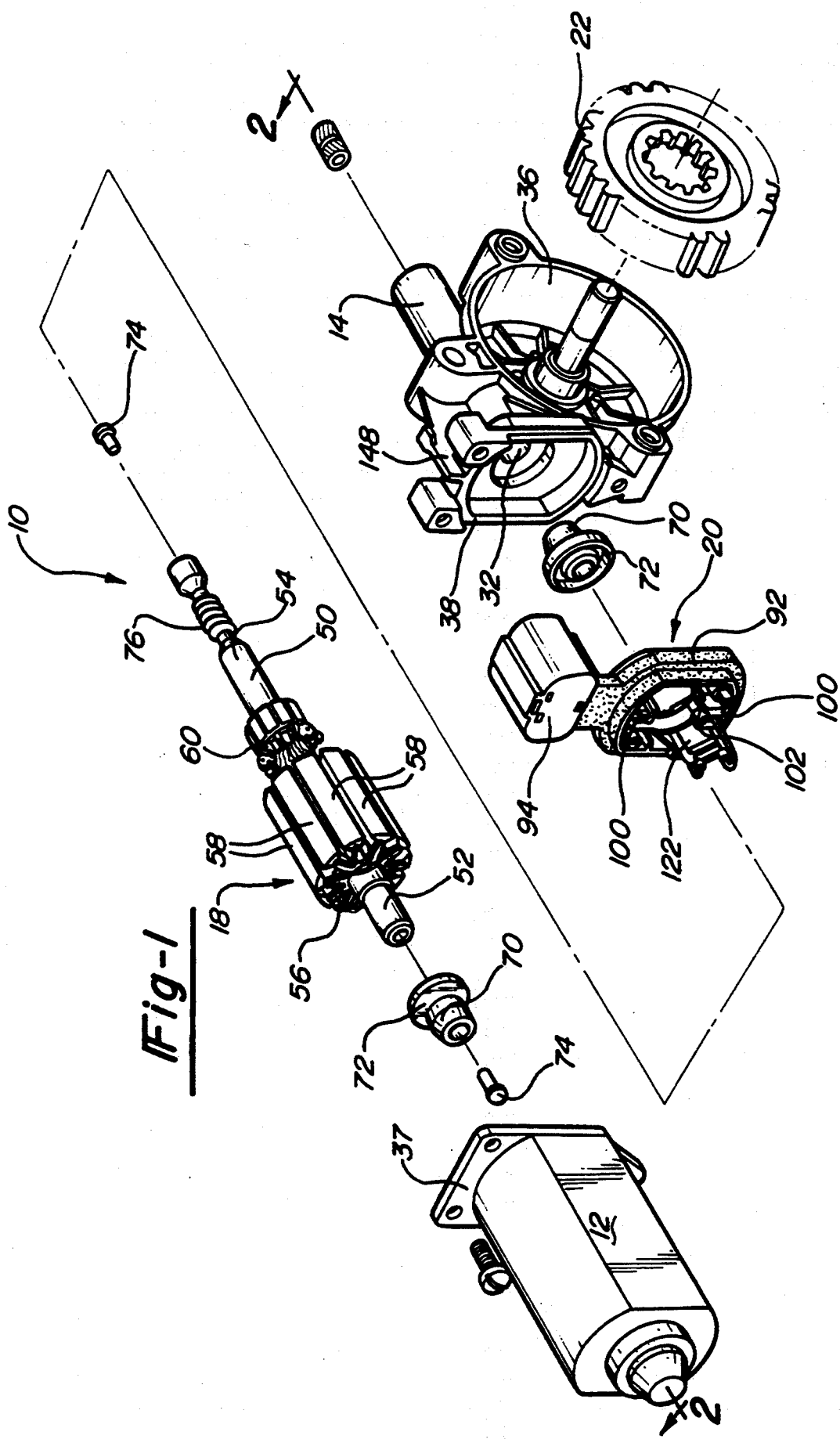
FIG. 1 is an exploded perspective view of the preferred embodiment of the motor of the present invention.
Figure 2:
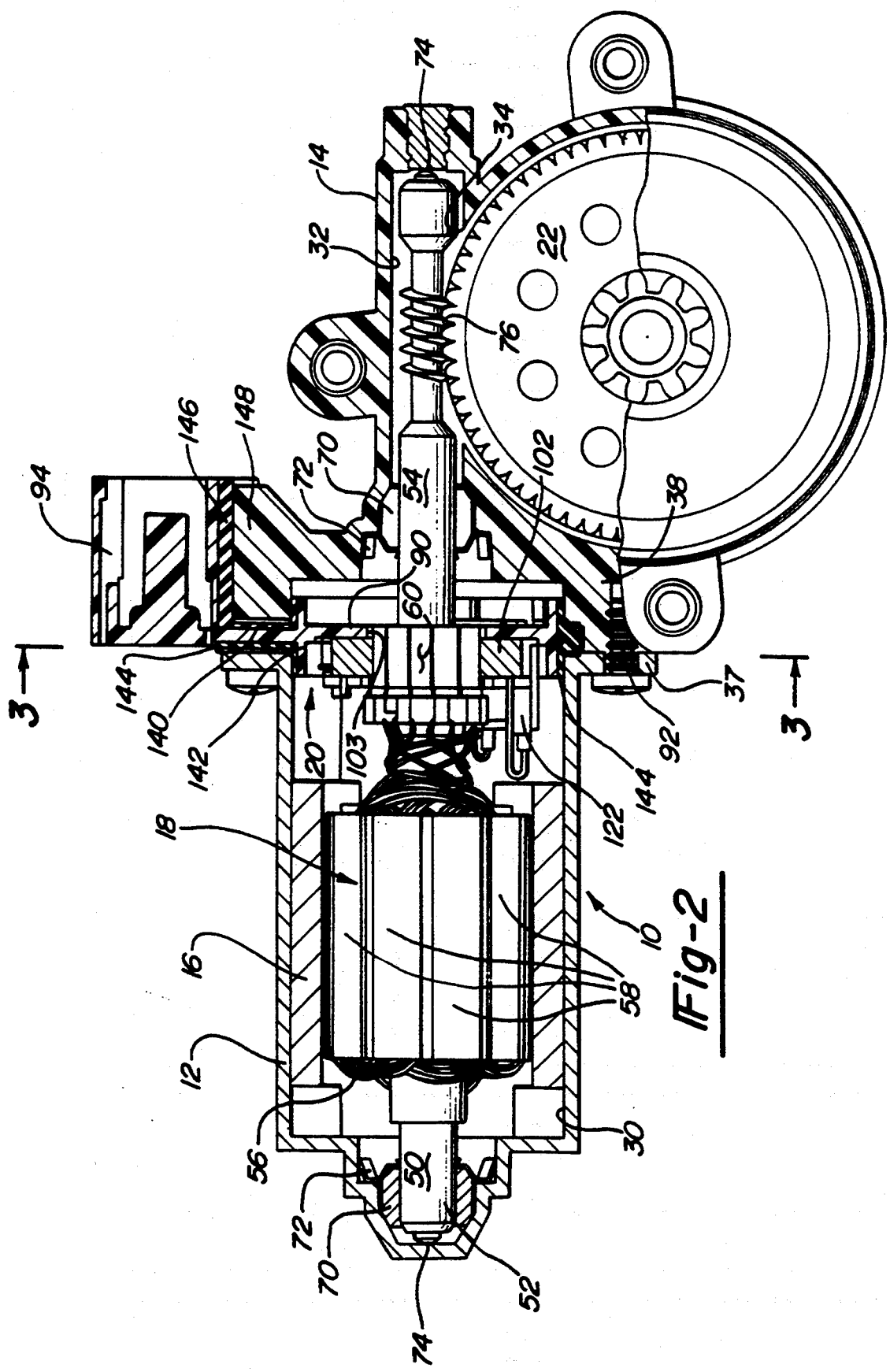
FIG. 2 is a sectional view, taken along line 2—2 of FIG. 1, of the present invention motor.

Typically, fractional horse power dc motors are used in automotive vehicles to operate side window lift mechanisms, to drive windshield wiper mechanisms, to operate anti-lock braking systems and to move other mechanized componentry. Referring to FIGS. 1 and 2, a motor 10 is shown having an armature housing 12, a gear housing 14, a stator 16, a rotor or armature 18, a brush card assembly 20 and a gear 22. Armature housing 12 has a substantially cylindrical bore 30 extending therein defined by an inside surface, against which stator 16 is internally mounted. Stator 16 is permanently magnetic in nature. Gear housing 14 also has a bore 32 extending longitudinally therewithin defined by an inside surface and further has a transverse passageway 34 therethrough which intersects a gear cavity 36. Armature housing 12 and gear housing 14 both have a flange, respectively 37 and 38, projecting therearound proximate with an open end 40 and 42 of each housing 12 and 14, respectively. Armature housing 12 is preferably made from a stamped metallic material and gear housing 14 is preferably injection molded from a 45% glass filled Zytel which can be purchased from DuPont.

Armature 18 is centrally mounted around an armature shaft 50. Armature shaft 50 has a pedestal segment 52 and a driving segment 54 protruding longitudinally from each end of armature 18. Furthermore, armature 18 is an electromagnetic device constructed from a plurality of wire windings 56 wrapped inside a plurality of armature pack slots which are juxtaposed between a plurality of magnetically conductive armature teeth 58. A commutator 60 is positioned longitudinally adjacent to armature 18 and surrounds armature shaft 50 near driving segment 54. Armature shaft 50 is rotatably journalled within armature and gear housings 12 and 14, respectively, by a pair of bearings 70 and retainers 72. Moreover, a pair of thrust buttons 74 are inserted into each distal end of armature shaft 50. Driving segment 54 of armature shaft 50 contains helical threads 76 which operably engage gear 22 thereby providing a drive means for operating a window lift mechanism or the like.

Brush card assembly 20 has a support member 90, an interface portion 92 and an electrical connector 94. This can best be seen in FIGS. 2 through 5. Support member 90 is injection molded from a non-conductive polymeric material such as Rynite SST-35 which can be obtained from DuPont. Furthermore, support member 90 has a substantially flat pair of faces 96 and 98 with a pair of brush boxes 100 projecting from face 96. Each brush box 100 has an internal cavity which holds and positions a solid rectangular metallic brush 102. Brushes 102 are held within brush boxes 100 for reciprocating motion adjacent to a circular aperture 103, defined by an inner edge, within support member 90. Moreover, a pair of brush springs 104 are positioned to urge brushes 102 inwardly against commutator 60. Additionally, a pair of conductive metallic traces 106 and 108 are insert molded within brush card assembly 20. Traces 106 and 108 terminate within electrical connector 94 thereby forming electrical contacts 110 and 112. This provides for an external dc electrical connection with an automotive vehicle wire harness (not shown). Electrically conductive shunts 120 transmit electrical current from traces 106 and 108 either directly to brushes 102 or indirectly through a circuit breaker 122. Accordingly, electrical current is supplied through electrical contacts 110 and 112, through traces 106 and 108, through shunts 120 and circuit breaker 122, through brushes 102, through commutator 60 and to wire windings 56 so as to allow armature 18 to create an electromagnetic field therearound thereby acting in association with stator 16 to rotate armature shaft 50.

This present invention specifically pertains to a means for vibrationally isolating brush card assembly 20 from armature and gear housings, respectively 12 and 14, thus reducing audible noise. This is accomplished by partially encapsulating an inner lip member 140 which surrounds an upturned peripheral wall 142 bordering support segment 90 of brush card assembly 20. This inner lip member 140 is shown unencapsulated in FIG. 4. Referring now to FIGS. 2, 3, 5 and 6, it can be observed that inner lip member 140 is illustrated as being encapsulated within an elastomeric material 144 such as Alcryn 2060 which can be purchased from DuPont. A channel portion 146 is also partially encapsulated. This channel portion 146 serves to support electrical connector 94 upon an upstanding rib 148 formed within flange 38 of gear housing 14. Moreover, elastomeric material 144 is supplementally retained upon inner lip member 140 and peripheral wall 142 through a series of dovetail interlocking formations 150. Therefore, brush card assembly 20 is vibrationally isolated from housings 12 and 14 when affixed between flanges 37 and 38. Additionally, elastomeric material 144 provides a water tight seal between armature housing 12 and gear housing 14 when brush card assembly 20 is compressibly trapped therebetween.

While the preferred embodiment of this motor with an isolated brush card assembly has been disclosed, it will be appreciated that various modifications may be made without departing from the present invention. For example, the armature housing and the gear housing may be integrated into a single part with the brush card assembly being retained internally thereto. Furthermore, while a specific dc armature, commutator and stator construction has been described, many other direct current and even alternating current motor designs can use an isolated brush card assembly in a similar manner without departing from this invention. Moreover, a motor having an isolated brush card assembly can be used in non-automotive systems. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A motor comprising:
    a first housing having a bore extending longitudinally therewithin defined by an inside surface thereabout;
    a second housing;
    a magnetic stator being mounted internal to a predetermined longitudinal portion of said first housing congruent with said bore therewithin;
    an electromagnetic armature being mounted upon an armature shaft centrally extending therethrough and such that said armature shaft protrudes from each end thereof, said armature further having a plurality of wire windings thereabout for creating an electromagnetic field therearound;
    a commutator being longitudinally adjacent to said armature and surrounding said armature shaft thereabout;
    a brush card assembly having a support member with an aperture therethrough defined by an inner edge thereabout, said support member retaining a pair of electrically conductive brushes thereon such that said brushes are proximate with said inner edge about said aperture therein, said support member having an interface portion thereof, said interface portion of said brush card assembly further having an inner lip member therein being at least partially encapsulated by an elastomeric material thereabout such that said inner lip member of said brush card assembly and said first housing have said elastomeric material therebetween, said elastomeric material separating said support member of said brush card assembly from said first and second housings disposed thereagainst; and said armature, said commutator and said armature shaft being concentrically juxtapositioned within said bore of said first housing such that said armature and armature shaft are rotatably journalled therewithin, said armature being in longitudinal registry with said stator therearound, said armature and said armature shaft being concentrically juxtapositioned within said bore of said first housing such that said armature and armature shaft are rotatably journalled therewithin, said armature being in longitudinal registry with said stator therearound;

said armature shaft extending through said aperture within said brush card assembly such that said commutator is displaced between said pair of brushes thereabout, said pair of brushes supplying electrical current to said commutator therewithin.

2. The motor of claim 1 further comprising:
a pair of electrically conductive traces being affixed upon said support member of said brush card assembly for supplying electrical current to said pair of brushes thereon.

3. The motor of claim 2 wherein:
said pair of traces are insert molded within said brush card assembly.

4. The motor of claim 3 further comprising:
an electrically conductive shunt electrically coupling each of said pair of brushes to a preselected one of said pair of traces.

5. The motor of claim 3 further comprising:
an electrical connector being integrally molded to said support member of said brush card assembly, said pair of traces terminating within said electrical connector thereby forming electrical contacts therein, said electrical connector being juxtapositioned external to said housings.

6. The motor of claim 1 wherein said housing includes:
an armature housing surrounding said armature therewithin;
a gear housing surrounding a driving segment of said armature shaft longitudinally displaced therealong; and
said encapsulated interface portion of said brush card assembly being at least partially trapped between said armature housing and said gear housing thereagainst.

7. The motor of claim 6 wherein:
said encapsulated interface portion of said brush card assembly seals between said armature housing and said gear housing thereby preventing water from entering therethrough.

8. The motor of claim 1 wherein:
said elastomeric material is insert molded within a injection molding process to at least partially encapsulate said inner lip member of said brush card assembly.

9. The motor of claim 8 wherein:
said elastomeric material is retained to said inner lip member of said brush card assembly through a plurality of dovetail interlocking formations.

10. The motor of claim 8 wherein:
said encapsulated interface portion of said brush card assembly vibrationally isolates said brush card assembly from said housings attached thereto.

11. The motor of claim 1 wherein:
a direct electrical current is supplied thereto.

12. The motor of claim 11 wherein:
a window lift mechanism of an automotive vehicle is in operative association therewith.

13. The motor of claim 11 wherein:
an anti-lock braking system of an automotive vehicle is in operative association therewith.

14. The motor of claim 11 wherein:
a windshield wiper mechanism of an automotive vehicle is in operative association therewith.

15. The motor of claim 1 wherein:
an alternating electrical current is supplied thereto.

16. A motor comprising:
a first housing;
a second housing;
a magnetic stator being mounted internal to one of said housings;
an electromagnetic armature being mounted upon an armature shaft, said armature further having a plurality of wire windings for creating an electromagnetic field;
a commutator adjacent to said armature and substantially surrounding said armature shaft;
a brush card having an aperture therethrough, said brush card retaining at least one electrically conductive brush thereon;
an elastomeric material separating said brush card from said first and second housings disposed thereagainst; and
said armature shaft extending through said aperture within said brush card such that said commutator is disposed adjacent to said at least one brush, said at least one brush supplying electrical current to said commutator for creating rotation of said armature and armature shaft in relation to said magnetic stator.

* * * * *

UNITED STATES PATENT AND TRADEMARK OFFICE
CERTIFICATE OF CORRECTION

PATENT NO. : 5,440,186
DATED : August 8, 1995
INVENTOR(S) : Eric A. Forsell et al It is certified that error appears in the above-indentified patent and that said Letters Patent is hereby corrected as shown below:

On title page item [73],
Assignee, "United Technologies Automotive, Inc." should be --United Technologies Motor Systems, Inc.--

Signed and Sealed this

Sixteenth Day of April, 1996

BRUCE LEHMAN

*Attest:*

*Attesting Officer*          Commissioner of Patents and Trademarks